US009286542B1

(12) United States Patent
Spering

(10) Patent No.: US 9,286,542 B1
(45) Date of Patent: Mar. 15, 2016

(54) PHOTOGRAPHIC STAGE

(71) Applicant: STYLINITY, INC., Astoria, NY (US)

(72) Inventor: Edward Prizer Spering, New York, NY (US)

(73) Assignee: Stylinity, Inc., New York, NY (US)

( * ) Notice: Subject to any disclaimer, the term of this patent is extended or adjusted under 35 U.S.C. 154(b) by 0 days.

(21) Appl. No.: 14/930,473

(22) Filed: Nov. 2, 2015

Related U.S. Application Data

(63) Continuation of application No. 14/406,737, filed as application No. PCT/US2013/045234 on Jun. 11, 2013, now Pat. No. 9,179,075.

(60) Provisional application No. 61/658,390, filed on Jun. 11, 2012.

(51) Int. Cl.

| | |
|---|---|
| *G03B 17/53* | (2006.01) |
| *H04N 5/222* | (2006.01) |
| *H04N 5/247* | (2006.01) |
| *G06K 9/62* | (2006.01) |
| *G06Q 30/02* | (2012.01) |
| *G06Q 50/00* | (2012.01) |
| *H04N 5/232* | (2006.01) |
| *H04N 5/262* | (2006.01) |

(52) U.S. Cl.
CPC .............. *G06K 9/6201* (2013.01); *G03B 17/53* (2013.01); *G06Q 30/0276* (2013.01); *G06Q 30/0277* (2013.01); *H04N 5/23238* (2013.01); *H04N 5/247* (2013.01); *H04N 5/262* (2013.01)

(58) Field of Classification Search
CPC ....................................................... G03B 17/53
See application file for complete search history.

(56) References Cited

U.S. PATENT DOCUMENTS

| | | | | |
|---|---|---|---|---|
| 6,298,197 | B1 * | 10/2001 | Wain | G03B 17/53 348/61 |
| 6,698,943 | B2 * | 3/2004 | Gluck | G03B 17/00 348/157 |
| 9,179,075 | B2 * | 11/2015 | Spering | G03B 17/53 |
| 2004/0080530 | A1 * | 4/2004 | Lee | G06T 19/006 715/738 |
| 2007/0057815 | A1 * | 3/2007 | Foy | G06Q 30/06 340/905 |
| 2007/0086626 | A1 * | 4/2007 | Mariani | G06K 9/00228 382/115 |
| 2007/0096909 | A1 | 5/2007 | Lally | |
| 2008/0174678 | A1 | 7/2008 | Solomon | |
| 2009/0118849 | A1 | 5/2009 | Dery et al. | |
| 2009/0125406 | A1 | 5/2009 | Lewis et al. | |
| 2009/0289108 | A1 | 11/2009 | Shimizu et al. | |
| 2012/0123830 | A1 * | 5/2012 | Svendsen | G06Q 30/0252 705/14.5 |
| 2015/0055931 | A1 * | 2/2015 | Koivukangas | H04N 5/772 386/228 |

FOREIGN PATENT DOCUMENTS

| | | |
|---|---|---|
| JP | 2007033264 | 2/2007 |
| KR | 101012758 | 2/2011 |
| WO | 02071147 | 9/2002 |

OTHER PUBLICATIONS

International Application No. PCT/US2013/045234, International Search Report and Written Opinion mailed Feb. 25, 2014.

* cited by examiner

*Primary Examiner* — WB Perkey
(74) *Attorney, Agent, or Firm* — Sheppard, Mullin, Richter & Hampton LLP

(57) ABSTRACT

A photographic stage is provided that includes at least one camera, a scanner, and a computer configured to capture a plurality of images from the at least one camera. The computer is also configured to detect a tagged item based on data from the scanner and to identify the tagged item in at least one of the images. A method of using the photographic stage and an apparatus is also provided.

20 Claims, 2 Drawing Sheets

PHOTOGRAPHIC STAGE

CROSS-REFERENCE TO RELATED APPLICATIONS

This application is a continuation application of U.S. patent application Ser. No. 14/406,737, filed Dec. 9, 2014, which is a National Phase application under 35 U.S.C. §371 of PCT Application, PCT/US13/45234, filed Jun. 11, 2013, which claims the benefit of U.S. Provisional Patent Application No. 61/658,390, filed on Jun. 11, 2012, the entirety of which is hereby incorporated by reference.

BACKGROUND OF THE INVENTION

The subject matter disclosed herein relates photography. More specifically, the subject disclosure relates to a photographic stage.

Current photo booths generally limit users to one perspective for photographs produced. They also tend to limit the ability to share photographs with others electronically, produce poor or limited light quality, have few if any monitors to allow for control, produce poor quality images, do not produce social advertising, and are structurally produced as confined spaces that are not very inviting. The limitations of conventional photo booths do not allow their use in producing content for retailers seeking to promote their clothing and accessories using their own customers, nor do they produce images that allow shoppers or home users to evaluate whether a particular article of clothing or an accessory are suitable for purchase or to wear on a given day.

BRIEF DESCRIPTION OF THE INVENTION

According to one aspect of the invention, a photographic stage is provided that includes at least one camera, a scanner, and a computer configured to capture a plurality of images from the at least one of camera. The computer is also configured to detect a tagged item based on data from the scanner and to identify the tagged item in at least one of the images.

According to another aspect, a method of using a photographic stage includes taking multiple images of a user by at least one camera coupled to a computer. The method additionally includes scanning, by a scanner coupled to the computer, a tagged item, and identifying, by the computer, the tagged item in at least one of the images.

Another aspect is an apparatus that includes a high resolution digital single-lens reflex camera with a wide-angle lens configured to capture an image of one or more users at a position, and a computer configured to control the high resolution digital single-lens reflex camera and wide-angle lens and apply image distortion adjustments to the image.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Exemplary embodiments provide a photographic stage containing multiple cameras and lighting elements capable of producing high quality images from multiple angles simultaneously or in rapid succession.

In exemplary embodiments, a photographic stage is designed to allow users to take high quality full length photographs from multiple angles simultaneously within a limited space and with excellent lighting. The present invention also allows users to choose from multiple photographic sets and to select the means of dissemination of those photographs, along with tagging of particular items worn such that retailers can utilize the resulting content to promote their products using their own customers. The present invention will also correct and enhance those photographs, provide audio guidance for those utilizing the photo booth, and will utilize radio-frequency identification or other means to identify the items a particular user is wearing. It will combine these various technologies to allow users to produce images and share them quickly with others for feedback and to produce social advertising for retailers that provide access to this invention to their customers, or for individuals to use the invention for their personal use in other settings.

Figure 1:
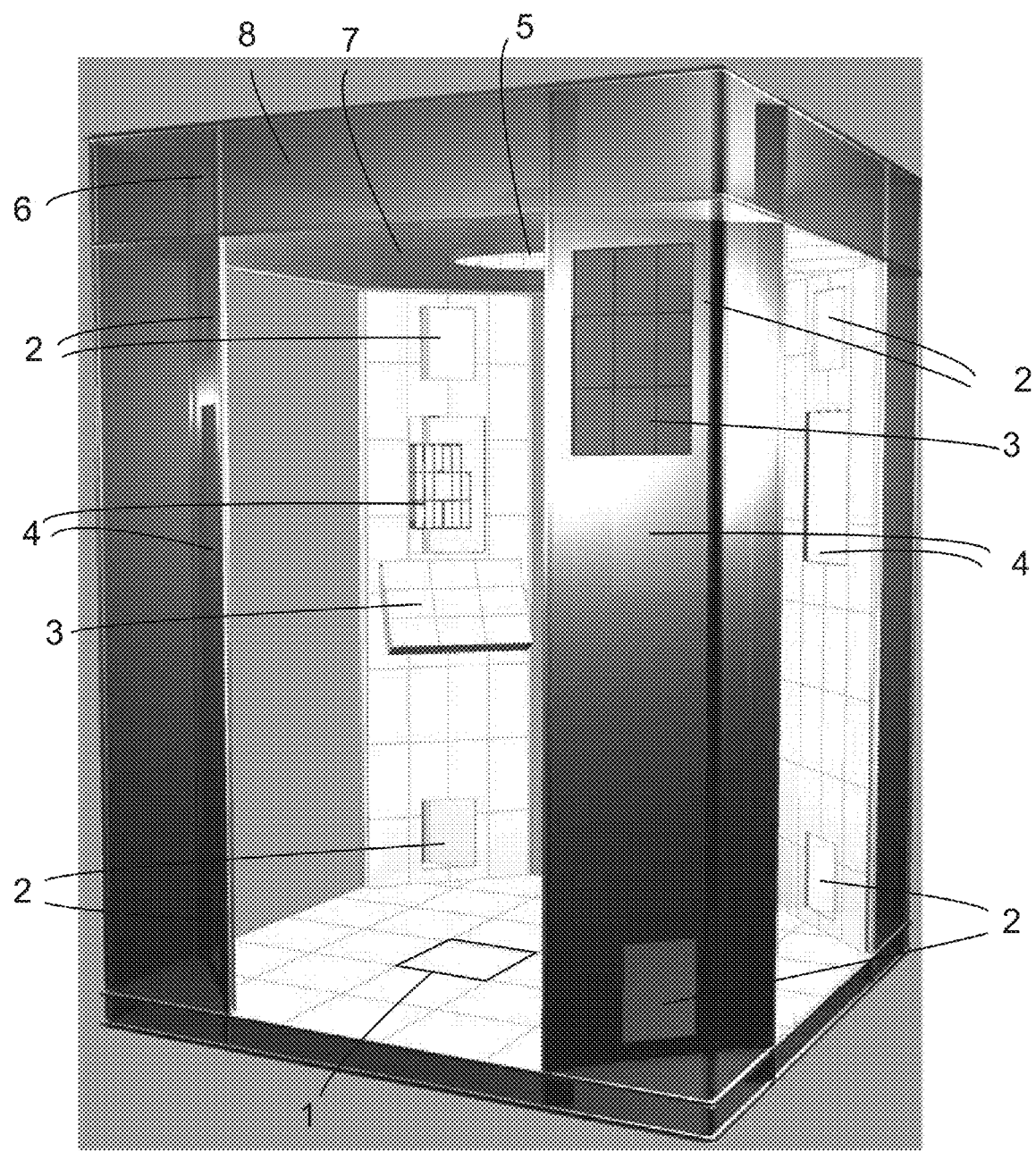
FIG. 1 is a first view of an embodiment of a photographic stage.
Figure 2:
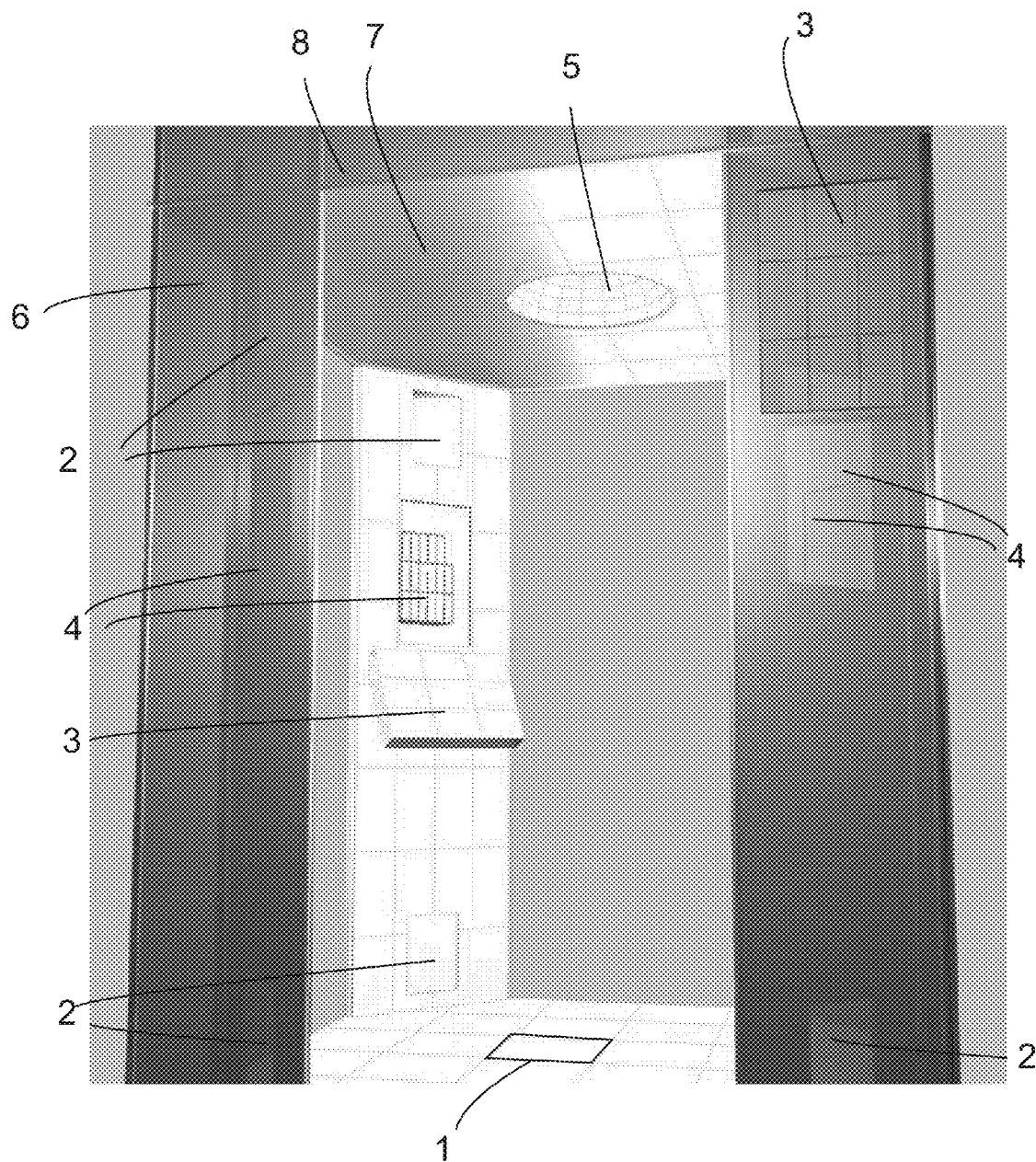
FIG. 2 is a second view of the photographic stage of FIG. 1.

Referring now to the drawings in more detail, FIGS. 1 and 2 demonstrate one possible configuration. FIG. 1 demonstrates a slightly angled frontal view of a photographic stage 6, with the main exterior body of the photographic stage 6. In this configuration, the photographic stage 6 can be seen to include a floor, a ceiling, and pylons in each of four corners, with most of the area being open space. The dimensions of the photographic stage 6 overall are about 74 inches (187.96 cm) long by 74 inches (187.96 cm) wide, with a height of about 100 inches (254 cm). A radio-frequency identification (RFID) scanner 1 is placed in the center of the area beneath the interior floor of the photographic stage 6, allowing the RFID scanner 1 to scan a person or persons standing above it for RFID tags contained within their clothing or accessories. Just above the location of the RFID scanner 1, on the interior floor itself, are two painted footprints that represent the ideal placement within the photographic stage 6 for the user to stand in order to generate optimal photographs based on the lighting and camera locations. The photographic stage 6 also includes multiple light sources 2, of which there are eight in this configuration. Each light source 2 in the current configuration can include two 48 watt compact fluorescent bulbs with high Color Rendering Index, for a total of 16 bulbs. Each light source 2 also utilizes a box focusing light forward and a diffuser sheet to help soften the light somewhat, minimizing shadows in the resulting photographs. Each light source 2 also contains appropriate wiring for the lights contained within monitors 3. The monitors 3 can be 21 inch (53.34 cm) multi-touch monitors. An outside monitor 3 may be used primarily to display photographs produced by the photographic stage 6 and an interior monitor 3 may primarily be used to allow individuals to review and select images, control the photographic stage 6, connect with the Internet, and share the images electronically with themselves or others. The photographic stage 6 also includes multiple cameras in housings 4. In this configuration, high resolution digital single-lens reflex (DSLR) cameras with 14 mm wide-angle lenses are used. These cameras and lenses are controlled remotely by a computer 7 to produce full length head to toe images of users standing on the footprints within the photographic stage 6. The interior height of the photographic stage 6 is about 84 inches (213.36 cm).

The cameras in housings 4 are mounted to optimize the angle such that full length photographs can be produced, with cameras mounted at approximately 65 inches (165.1 cm) above the interior floor and angled downwards. These cameras are placed behind one-way mirrors, such that the cameras are set back within the pylons almost to the exterior corners of the pylons. The one-way mirrors of camera housings 4 allow the user(s) to see their reflection(s) while also allowing the cameras to receive adequate light to capture photographs. The camera housing 4 in the pylon that also contains the interior monitor also houses an additional camera with motion sensing and depth sensing capabilities, such as a Microsoft Kinect™ camera, the data from which are used by the computer 7 to determine when users have entered the photographic stage 6 or have stopped moving, as well as to determine depth for assistance with background removal. The photographic stage 6 also includes an overhead speaker 5 and its compartment. In this configuration the overhead speaker 5 can be a SoundTube™ directed speaker, which can be heard primarily from directly below so as not to interfere with others around the photographic stage 6. The overhead speaker 5 in this instance has about a 20 inch (50.8 cm) parabolic reflector that directs sound downward, and is housed in an air-tight area of the ceiling. This air-tight configuration allows air to be evacuated through the ceiling by a fan 8, pulling air through the bases of the pylons and throughout the structure without pulling it through the opening for the overhead speaker 5. The physical body of the photographic stage 6 can include four triangular pylons, a floor, and a ceiling. Each corner pylon of the photographic stage 6 is substantially a right triangle in shape, with sides of about 18 inches (45.72 cm)×18 inches (45.72 cm)×25.46 inches (64.67 cm), with an exterior height of 100 inches (254 cm) and an interior height of 84 inches (213.36 cm). The interior floor of the photographic stage 6 is about 4.525 inches (11.494 cm) above the exterior floor, including a base layer of oriented strand board ¼ inch (0.635 cm) thick, an open interior space for wires and the RFID sensor of 3.025 inches (7.684 cm) thick, and an interior floor including another ½ inch (1.27 cm) thick piece of oriented strand board beneath a rubber floor, such as SwissTrax EcoTrax™, ¾ inch (1.905 cm) thick. The sides of the ceiling area of the photographic stage 6 are approximately 12 inches (30.48 cm) high with interior room for the directed overhead speaker 5 and the computer 7.

The computer 7 is located above a primary pylon containing the interior monitor 3, used to control the photographic stage 6. The structure of the photographic stage 6 itself is nearly air-tight, with small openings in the bases of each pylon, so that air is pulled in through the base of each pylon. This allows air to circulate past light fixtures and cameras in each pylon, rising up through the pylons and the ceiling. The warmed air is then evacuated out of the top through a fan and opening 8. The computer 7 can be placed directly above the primary pylon and within the ceiling. The computer 7 controls the cameras, speaker, and lighting. An exhaust fan and exhaust opening 8 circulate air through the pylons and the ceiling, allowing cool air to be brought through the structure while heated air is evacuated from the top. Wiring for the various monitors, lights, and cameras is not represented, though each electronic device has appropriate wires to allow them to receive power and be controlled by the computer 7. All wires are run internally through photographic stage 6 such that they are not visible to users of the photographic stage 6.

FIG. 2 represents the same objects as described in reference to FIG. 1, but from a different angle such that the locations of some objects can be more clearly seen in some circumstances.

The photographic stage 6 can be constructed of suitable materials including appropriate parts. In this particular configuration, all exterior pieces of the photographic stage 6 can be fabricated from fiberglass reinforced plastics, with a polished white coating and curved edges on the outside four corners, though metal, plastic, or other suitably strong material could be used for the exterior. Each of the four triangular corner pylons can have outside walls about 18 inches (45.72 cm) wide with an interior wall about 25.46 inches (64.67 cm) wide, with an exterior height of about 100 inches (254 cm) and an interior height of about 84 inches (213.36 cm). The side walls of the floor area can also be covered by a fiberglass reinforced plastic siding about 4.5 inches (11.43 cm) high and 38 inches (96.52 cm) long stretching between the pylons. The side walls of the ceiling can also be constructed of fiberglass reinforced plastic and can be about 12 inches (30.48 cm) high by 38 inches (96.52 cm) long, again stretching between the pylons. The interior floor space can be 74 inches (187.96 cm)×74 inches (187.96 cm), less the area occupied by the pylons themselves, and can be covered in a black rubber mat material, with two fuchsia colored footprints, e.g., Pantone Purple C™, painted on them to indicate the location on which the model should stand. The area under the mat can be reinforced and supported by suitable lumber, with an area of about 18 inches (45.72 cm) by 18 inches (45.72 cm) that remains open directly below the fuchsia footprints to accommodate an RFID reader, and with suitable other open areas to allow wires to run through the floors. The mat itself can rest on Oriented Strand Board about ½ inch (1.27 cm) thick to provide some flexibility and absorption of vibrations.

The framing can be constructed of suitable material, in this case of T-Slot aluminum pieces affixed to one another with appropriate fasteners. The framing is strong enough to handle potential force exerted against the structure from any angle by a human, and also to support the cameras, monitors, lights, and the hanging speaker, as well as the exterior pieces themselves. In this construction, framing profiles with a width of about 40 mm can be used. The ceiling pieces can also be constructed of fiberglass reinforced plastic, with an interior ceiling of about 74 inches (187.96 cm) by 74 inches (187.96 cm), less the area occupied by the pylons and about a 20 inch (50.8 cm) diameter cut-out in the center for the overhead speaker 5. The exterior ceiling and exterior floor are also to be constructed of about 74 inch (187.96 cm) by 74 inch (187.96 cm) fiberglass reinforced plastic sheets.

The light fixtures 2 can each be contained within boxes made of suitable plastic material to reflect light onto the subject, and with polycarbonate windows covered with a suitable diffuser material to soften the light. The polycarbonate windows are in this configuration are about 10 inches (25.4 cm) high by 8 inches (20.32 cm) wide, vertically oriented, and with the light focused such that it is primarily projected forwards, though alternate lighting configurations using larger or smaller lights, including lights directed in a different manner, could be utilized. The bulbs can be suitably mounted internally within their light boxes, along with wiring, such that they are not in direct contact with any surfaces and cannot cause a fire. The bulb housings can also contain suitable openings allowing air to circulate through lighting fixtures to evacuate excess heat.

The camera housings 4 are designed such that a camera can be mounted at a fixed angle within the housing, held as close to the corner as possible for the furthest distance from the subject. The housing is to be light tight, such that the only light entering the housing comes through the one-way mirror the housing shares with the interior, user facing, wall of the pylon.

The one-way mirrors are about 11 inches (27.94 cm) by 22 inches (55.88 cm), vertically oriented, though a larger mirror is possible and may likely be incorporated into a future version. The camera housings within the pylon can have similar dimensions, though extending back almost to the external corner of the pylon, and with care for ensuring air flow around the housings is possible. Wiring is fed through the base of the camera housing through a light tight enclosure such that no light enters the box except through the one way mirror, and the interior surfaces of the camera housing other than the one way mirror itself can be painted a flat black color to minimize internal reflection that could diminish the quality of the photographs. Within the camera housing, suitable cameras, such as Canon™ DSLR cameras with 14 mm Rokinon™ lenses, can be used. The pylon the user faces, which also contains the interior monitor, can also contain a second camera, such as a Microsoft Kinect™ device containing a camera and infrared sensor, that can detect motion and depth, and which will be suitable for determining when a user has entered or exited the photographic stage 6, as well as their location and whether they have stopped moving.

The exterior monitor 3 of the two monitors 3 in FIGS. 1 and 2, can be mounted with its screen nearly flush with the exterior of the pylon furthest from the internal monitor, and in such a manner that it will be most visible to those seeing the photographic stage 6 from far away across a crowded retail environment. This monitor 3 can be situated with the bottom at approximately eye level, or about 65 inches (165.1 cm) above the external floor, such that most people observing it up close will have to look up slightly, and this monitor can be mounted vertically to minimize the necessary size of the pylons. The interior monitor 3 can be located suitably low, with the top of the screen at approximately 44 inches (111.76 cm) above the interior floor. It can be mounted somewhat indented into the pylon, and at an angle such that it will not block the field of view of the camera housed above it and such that the user can easily bend over slightly to type on the multi-touch screen to control the photographic stage 6, enter their e-mail address, or otherwise use the included software and internet capabilities to electronically share their photographs.

The ceiling can contain about a 20 inch (50.8 cm) diameter hole that houses a parabolic directed speaker above the center of the interior of the photographic stage 6, allowing the user to hear instructions while standing directly below. This speaker could be substituted for an alternate speaker or removed entirely. The interior of the ceiling can provide both room for this speaker and suitable fiberglass reinforced plastic walls around it to prevent air from entering through this opening, such that the exhaust fan will pull in air from the base of each pylon rather than through this opening. These walls can also be sufficiently thick and of fiberglass reinforced plastic to minimize the transmission of sound through the structure itself, helping ensure that the sound produced by the directed speaker is primarily heard by the individual(s) directly below.

Wiring for the devices contained within the photographic stage 6 can be hidden from view, maintaining the aesthetics of the structure. Bolts and other fasteners are also designed to be hidden from view. At the time of assembly, the pylons can first be erected along with the frame.

The ceiling and exterior floor can then be added, and then after all fasteners have been added, the last of these to the bottoms of the pylons and the interior floor, the rubber mat will be placed above the interior floor to hide any remaining visible bolts or other fasteners, such that the user of the photographic stage 6 will see a minimum number of seams and fasteners. The structure could be assembled in a different manner, and bolts could be made visible, but that was not desired for this configuration.

The computer 7 housed within the ceiling of the photographic stage 6 is suitably powerful enough to control the RFID scanner 1, cameras 4, lights 2, monitors 3, speaker 5, and other elements of the photographic stage 6, as well as to process the images in a rapid fashion, interact with the user, and allow the photographs to be rapidly electronically disseminated. The computer 7 must also be able to control the sequence of recorded sounds and process the data coming back from cameras and other electronic devices such that it can recognize when the user has stopped moving and respond to other controls via the multi-touch monitors.

The photographic stage 6 could also be composed of other materials or parts, provided they were capable of producing quality images from multiple angles. It could utilize smaller or larger dimensions, be constructed of materials other than fiberglass reinforced plastic and aluminum, and could utilize more or fewer cameras, or cameras of other sorts. It could contain more or fewer monitors, more speakers or no speaker, and could contain alternate lighting configurations. The pylons could be smaller or larger, and could be oriented differently to facilitate different angles. There could be more or fewer pylons, or no pylons at all and instead cameras mounted within walls or on other structures holding them in the air. Walls could be added to increase privacy, or the space between pylons increased or decreased. Different lenses or camera types could be utilized, as could stitching software to allow different images to be taken and stitched together, or for the perspective to be altered. Additional cameras or software could be added to allow construction of 360 degree images showing the user from all angles or facilitating a rotating view of the user.

The following description of the method of use applies only to this configuration, and many elements could be altered while retaining the fundamental capabilities of the invention. The photographic stage 6 is designed primarily to be used by retail shoppers to evaluate items prior to purchase. In general use, an individual will enter the photographic stage 6 and the computer and associated cameras will determine that they have entered. They will hear audio instructing them to press the button to begin, at which point they will see a large button visible on the internal monitor that they can press to initiate the sequence. Pressing this button will cause the overhead speaker to play a recorded message instructing them to stand on the fuchsia colored footprints, which should be the same size as approximately a women's size 5 shoe such that they will generally be covered by footwear and not become visible in the majority of the resulting images produced by the invention. The speaker will direct them that the invention will take three sets of photographs from all four sides and will initiate after they stop moving. After the user is appropriately situated and has stopped moving, the screen will display a count down and photographs will be taken. As the images are taken, the computer will process them to reduce distortion, adjust for lighting, and to otherwise improve the quality of the images. The RFID scanner will also scan for RFID tags embedded within their clothing or accessories in order to ascertain what the user is wearing and record that information in a database. After the third set of photographs the user will be invited to review the images on the internal monitor. The user will be able to select one or more sets of photographs, and will then be able to enter an e-mail address or other means of communication in order to receive the images. If the user has the appropriate application on their wireless device, such as a phone, and it is suitably enabled, the computer may also recognize them using Bluetooth, WiFi, Near field communication, or other suitable technology.

The user will also be asked to agree to the Terms and Conditions for both the invention and the corresponding website, and will be able to choose whether to share the images produced through the website or through other websites, such as Facebook™. Images shared will be tagged with the appropriate information pulled from a database of the retailer's line of clothing and accessories, and will be uploaded to the website's database, where additional tags will be added in such cases as a user has a profile with the associated website. If the user agrees to the Terms and Conditions, selects photographs, and enters an e-mail address or is identified in such a manner that the computer is authorized to share with them their photographs, they will receive their images immediately via e-mail or through the appropriate website. If they have chosen to share images publicly, the images may also be shared through the external monitor which will generally display images taken by the invention at that particular retailer's store or stores.

The advantages of this invention over existing photo booths are many, and include, without limitation, the ability to take multiple photographs simultaneously within a relatively small space. Another advantage is the introduction of a directed speaker for instruction. An additional advantage is the provision of very high quality lighting to produce excellent images while improving the aesthetics of those standing within the photographic stage 6. An additional advantage is the software and multi-touch monitors that allow those using the photographic stage 6 to select their favorite photographs and share them online. An additional advantage is the inclusion of an RFID scanner and appropriate software to add tags to images such that they can later be indexed and searched online. An additional advantage is the ability to use this content to improve sales, reduce returns, and provide additional metrics for retailers choosing to utilize this invention. An additional advantage is the ability of the photographic stage 6 to sense movement and time photographs appropriately. An additional advantage is the ability of the invention to enhance photographs, minimize distortion, and reduce background such that the images produced are of the highest quality. An additional advantage is the ability of the user to see the capabilities and resulting images on an external monitor. An additional advantage is the ability to share these images electronically for feedback in real time with others while still in a retail environment.

Exemplary embodiments provide a stage that allows people to produce photographs they can utilize in making purchasing decisions that also allows retailers providing access to the photographic stage 6 to utilize their customers as models representing their own products. The photographic stage 6 facilitates the creation and dissemination of photographic content of people wearing clothing and accessories in way that improves their quality, provides ease of use, and allows for useful feedback and additional information for both users and retailers who provide access to the photographic stage 6.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A system comprising:
    at least one camera configured to take multiple images of a user;
    a scanner coupled to the at least one camera and configure to scan a tagged item in at least one image of the multiple images of the user;
    a computer coupled to the scanner and configured to identify the tagged item in the at least one image of the multiple images of the user based on a scan of the tagged item, the at least one image of the multiple images of the user utilized in creating an advertisement of the tagged item based on identification of the tagged item in the at least one image.

2. The system of claim 1, further comprising:
    a plurality of cameras including the at least one camera configured to take the multiple images of the user simultaneously, the multiple images representing different views of the user.

3. The system of claim 1, further comprising:
    an RFID scanner configured to detect an RFID tag associated with the tagged item;
    wherein the computer is further configured to use detection of the RFID tag associated with the tagged item to identify the tagged item in the at least one image of the multiple images of the user.

4. The system of claim 1, wherein the at least one image of the multiple images of the user is a full length photograph of the user.

5. The system of claim 1, further comprising:
    a motion sensing and depth sensing camera coupled to the computer and positioned to detect when the user is in image capture range of the at least one camera;
    wherein the computer is further configured to instruct the at least one camera to take the multiple images of the user in response to detection of the user by the motion sensing and depth sensing camera.

6. The system of claim 1, further comprising an internal monitor through which the user can control publishing of the advertisement of the tagged item.

7. The system of claim 1, wherein the computer is further configured to tag the at least one image of the multiple images of the user based on the identification of the tagged item in the at least one image for use in identifying the at least one image as including the tagged item.

8. The system of claim 1, wherein the computer is further configured to:
    tag the at least one image of the multiple images of the user based on the identification of the tagged item in the at least one image;
    store the at least one image of the multiple images of the user with a tag based on the identification of the tagged item in the at least one image to allow the at least one image of the multiple images to be searched for based on the tag.

9. The system of claim 1, further comprising a user interface through which the user can choose to display the at least one image of the multiple images publicly at a retailer of the tagged item.

10. The system of claim 1, wherein the computer is further configured to:
  tag the at least one image of the multiple images of the user based on the identification of the tagged item in the at least one image;
  store the at least one image of the multiple images of the user with a tag based on the identification of the tagged item in the at least one image to allow the at least one image of the multiple images to be searched for based on the tag and on information of the tagged item from a retailer of the tagged item.

11. A method comprising:
  providing at least one camera configured to take multiple images of a user;
  scanning a tagged item in at least one image of the multiple images of the user utilizing a scanner coupled to the at least one camera;
  identifying the tagged item in the at least one image of the multiple images of the user based on a scan of the tagged item utilizing a computer coupled to the scanner, the at least one image of the multiple images of the user utilized in creating an advertisement of the tagged item based on identification of the tagged item in the at least one image.

12. The method of claim 11, further comprising:
  providing a plurality of cameras including the at least one camera configured to take the multiple images of the user simultaneously, the multiple images representing different views of the user.

13. The method of claim 11, further comprising:
  detecting an RFID tag associated with the tagged item;
  identifying the tagged item in the at least one image of the multiple images of the user, using detection of the RFID tag associated with the tagged item.

14. The method of claim 11, wherein the at least one image of the multiple images of the user is a full length photograph of the user.

15. The method of claim 11, further comprising:
  detecting, by a motion sensing and depth sensing camera, when the user is in image capture range of the at least one camera;
  instructing the at least one camera to take the multiple images of the user in response to detection of the user by the motion sensing and depth sensing camera.

16. The method of claim 11, further comprising providing an internal monitor through which the user can control publishing of the advertisement of the tagged item.

17. The method of claim 11, further comprising tagging the at least one image of the multiple images of the user based on the identification of the tagged item in the at least one image for use in identifying the at least one image as including the tagged item.

18. The method of claim 11, further comprising:
  tagging the at least one image of the multiple images of the user based on the identification of the tagged item in the at least one image;
  storing the at least one image of the multiple images of the user with a tag based on the identification of the tagged item in the at least one image to allow the at least one image of the multiple images to be searched for based on the tag.

19. The method of claim 11, further comprising:
  tagging the at least one image of the multiple images of the user based on the identification of the tagged item in the at least one image;
  storing the at least one image of the multiple images of the user with a tag based on the identification of the tagged item in the at least one image to allow the at least one image of the multiple images to be searched for based on the tag and on information of the tagged item from a retailer of the tagged item.

20. A system comprising:
  means for providing at least one camera configured to take multiple images of a user;
  means for scanning a tagged item in at least one image of the multiple images of the user utilizing a scanner coupled to the at least one camera;
  means for identifying the tagged item in the at least one image of the multiple images of the user based on a scan of the tagged item utilizing a computer coupled to the scanner, the at least one image of the multiple images of the user utilized in creating an advertisement of the tagged item based on identification of the tagged item in the at least one image.

* * * * *